(No Model.) 2 Sheets—Sheet 1.
W. A. PHILLIPS & J. B. ENTZ.
STORAGE BATTERY.
No. 518,966. Patented May 1, 1894.
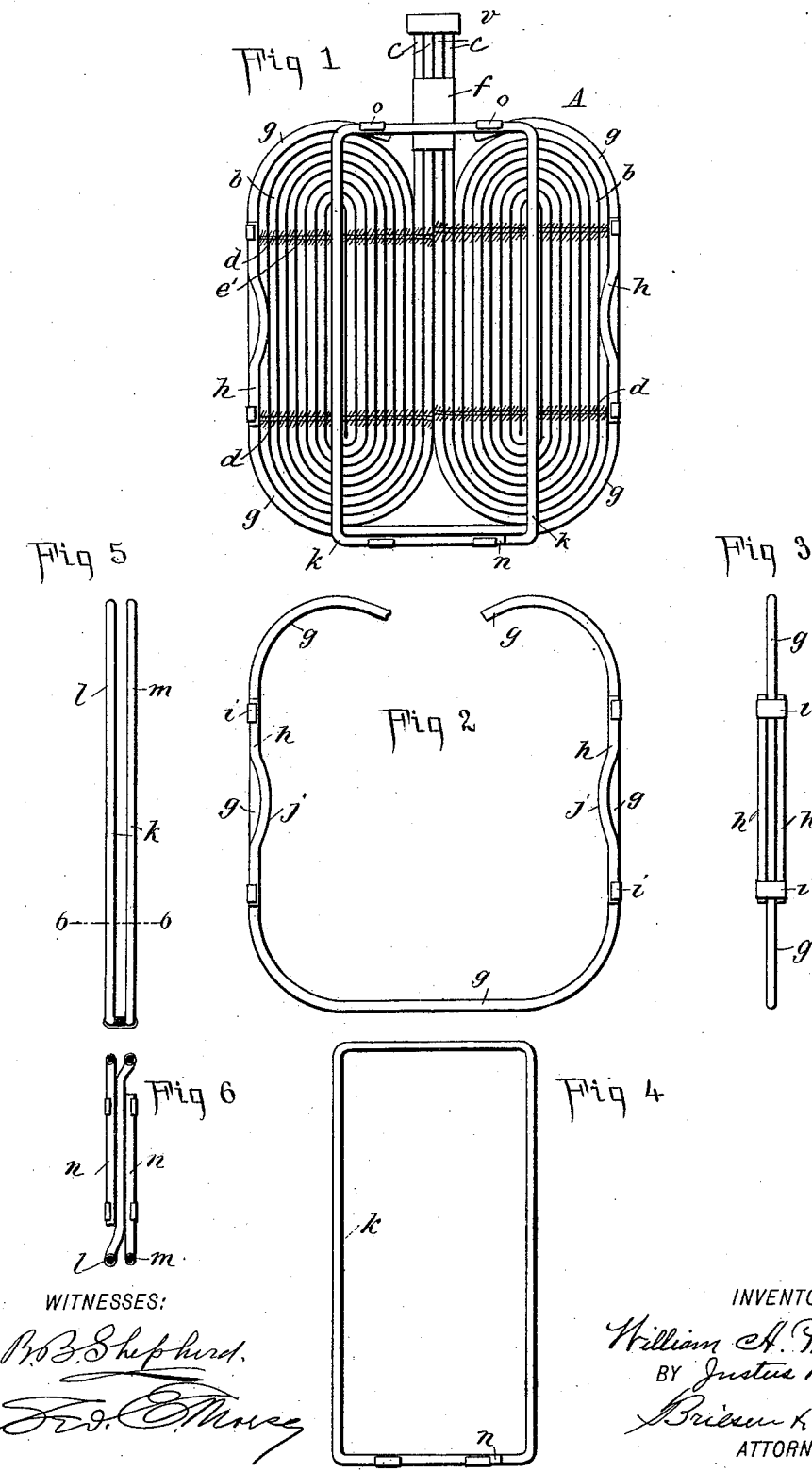
WITNESSES:
INVENTORS
William A. Phillips,
BY Justus B. Entz.
ATTORNEYS.

(No Model.) 2 Sheets—Sheet 2.
W. A. PHILLIPS & J. B. ENTZ.
STORAGE BATTERY.
No. 518,966. Patented May 1, 1894.
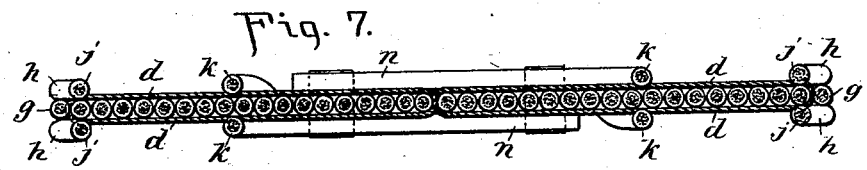
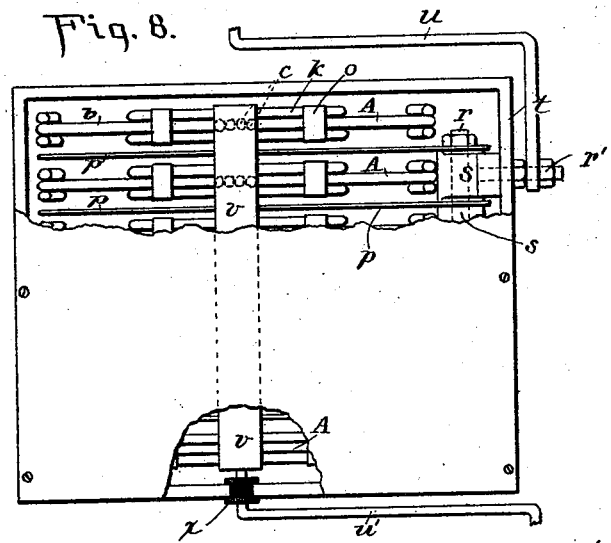
WITNESSES:
INVENTORS
William A. Phillips,
Justus B. Entz,
BY
ATTORNEYS.

UNITED STATES PATENT OFFICE.

WILLIAM A. PHILLIPS AND JUSTUS B. ENTZ, OF BRIDGEPORT, CONNECTICUT, ASSIGNORS TO THE WADDELL-ENTZ COMPANY OF WEST VIRGINIA.

STORAGE-BATTERY.

SPECIFICATION forming part of Letters Patent No. 518,966, dated May 1, 1894.

Application filed June 20, 1893. Serial No. 478,261. (No model.)

*To all whom it may concern:*

Be it known that we, WILLIAM A. PHILLIPS, a subject of the Queen of Great Britain, and JUSTUS B. ENTZ, a citizen of the United States, residing at Bridgeport, county of Fairfield, Connecticut, have invented certain new and useful Improvements in Storage-Batteries, of which the following is a specification.

The present invention relates to storage batteries, and to methods of treating the same.

The invention consists, first, in several improvements in the mechanical construction of such batteries, and, second, in the treatment of the batteries, as hereinafter described and set forth in the claims.

In the accompanying drawings, illustrating the invention, Figure 1 is a side view of our improved mat. Fig. 2 is a side view of a part of the holding frame. Fig. 3 is a view at right angles thereto. Fig. 4 is a side view of another part of said frame. Fig. 5 is a view thereof at right angles to Fig. 4. Fig. 6 is a sectional view on line 6—6 of Fig. 5. Fig. 7 is an enlarged central horizontal section of the mat. Fig. 8 is a plan view of a cell, a part of the cover being broken away; and Fig. 9 is a side view of one of the plates of the negative electrode.

In Patent No. 421,916, dated February 25, 1890, we have described a material for a positive electrode of our storage battery, consisting of a wire covered with a braid or net work of finer wire and insulated and bent to form a battery plate. In Patent No. 461,823, dated October 27, 1891, we have described another construction of battery plates or electrodes formed from wire similar to that described in the first mentioned patent. In said construction the insulated wire was bent upon itself in a zigzag manner to form a mat, and had U-shaped pieces of insulated wire partially surrounding the mat, and secured to it by stitching through the same to bind the mat together and at the same time separate the plates. The present invention constitutes an improvement of this form of battery plate or mat, and especially in the way in which the insulated battery wire is formed into a mat, and in the construction of the holding frame. The mat A is composed of two lobes $b$, each of which consists of a flat spiral coil made by doubling the insulated battery wire at its center, and winding it thus doubled into an oblong spiral, as shown in the drawings, thus leaving two exposed ends $c$ on each lobe $b$. When the coil has been wound into this form, which is preferably done by machinery, giving the desired shape to the coil, a securing cord or cords $d$ are tied or otherwise fastened around each lobe transversely, and secured from endwise movement by a layer of binding or cementing material $e'$, for example, whiting. Two coils or lobes made as described, are then placed together, edge to edge, as shown in Fig. 1, and the free ends $c\,c$ secured together, preferably by a sheet metal band $f$, tightly clamped thereon. To further bind the parts together a frame consisting of an insulated wire $g$ is bent into the form of a figure having the outline which it is desired the mat to have, and to the two sides thereof are secured the short wires $h\,h$ by sheet metal clamps $i$, or otherwise. These short wires, separated by a distance equal to the diameter of the wire $g$ and its insulation, are in planes parallel with the plane of the figure formed by the wire $g$, and at the center of the wires $h$ are formed bends $j$ extending inward, as clearly shown in Fig. 2. This part of the frame extends nearly around the periphery of the mat A, and is preferably secured in place by a binding or cementing material, which hardens or sets after application, such as whiting. When placed around the said periphery the bent portions $j$ of the frame will slightly overlap the mat A on opposite sides and will serve to hold the wire $g$ in place and to prevent contact of the mat A with the intermediate battery plates $p$ and with the walls of the cell. A second part or member of the frame of the mat A is shown in Figs. 4, 5 and 6. This part consists of a wire $k$ wound into a spiral with two turns $l$, $m$, the coil preferably being rectangular and oblong, as shown in the drawings. The ends $n$ of the wire of which the coil is made, overlap and are secured together and to the middle strand of the coil $k$ at the lower end by suitable clamps as shown in detail in Fig. 6. This connection, it will be seen, binds the two turns of the coil together at the lower end of the figure, leaving the turns of the coil disconnected at the upper end. This device is then slipped onto the mat A, as shown in Fig. 1, one turn of the coil standing on one side, and the other turn on the opposite side of the mat. Said two turns are then drawn together at the top and connected above the mat by sheet metal clamps $o$, or by other suitable means. It will be seen that the construction of the frame above described is exceedingly simple, and that it gives an exceedingly strong mat and that the parts are held together without stitching, or other similar complicated operation. The plates for the other electrodes of the battery are preferably of sheet steel, one such plate $p$ being shown in Fig. 9, the cell $t$ being of like material. The plates $p$ have holes $q$, through which may be passed a bolt $r$, and on the bolt between the plates are suitable metallic spacing washers $s$. These plates $p$ are metallically connected to the steel walls of the cell $t$, by a projecting pin $r'$ on one of the washers $s$, said pin being provided with two nuts, one of which is screwed directly up against the cell, and the other of which may be removed to allow a loop at the end of the conductor $u$ to be connected when it is desired to electrically connect the cell. The required number of the mats A are arranged at suitable distances apart and the ends $c$ secured to a metal cross bar $v$ from which a conductor $u'$ extends through an insulating spool $x$ in one side of the cell, as shown. It will be seen from Fig. 8 that the wires of the frame surrounding the mat A serve also to hold the plates $p$ from sidewise movement. When the battery is sent out the steel plates which constitute the negative electrode are coated with paraffine or oil, and if found necessary other parts of the cell also are coated with paraffine or oil, to protect them against rust, and we find that this paraffine can be removed from the plates most readily by merely raising the temperature of the plates or of the battery solution before or in the act of charging the battery, to a sufficient temperature to melt the paraffine, thus removing it from the plates, and allowing it to rise to the top of the solution, where it may be allowed to remain, serving in that case also as a seal to exclude air from the solution. This heating may be accomplished by carrying out the method described in our Patent No. 467,573, dated January 26, 1892, or otherwise. The electrodes described are preferably used in a solution of potassium or sodium zincate, each battery cell being furnished with a small quantity of mercury. When current is first sent through the battery to charge it, after raising the temperature to remove the paraffine, if paraffine is used, the mercury will rapidly spread over the steel plates, and will amalgamate them. This is a great saving over old methods of amalgamated plates requiring special operations for that particular purpose.

What we claim is—

1. A battery plate or element made of one or more lobes $b$ of insulated wire formed by a wire doubled at its center and wound thus doubled into a flat spiral, substantially as described.

2. A battery plate or element, having two flat spirals or lobes of insulated wire placed together, edge to edge, to form a mat, means for securing the same together, each of said flat spirals having exposed ends for connection to a circuit, substantially as described.

3. A battery plate or element made of one or more lobes of insulated wire formed by a wire doubled at its center, and wound thus doubled into a flat spiral, each lobe having a separate transverse binding cord, substantially as described.

4. A battery plate or element made of one or more lobes of insulated wire wound into a flat spiral, each lobe having a transverse binding cord secured in place by whiting or similar binding material, substantially as described.

5. A frame for securing the parts of a battery plate, and for separating adjacent plates, said frame consisting of the wire $g$ and the short wires $h$ supported by the wire $g$, and projecting inward on each side of the wire $g$, substantially as described.

6. The combination with a mat or plate for a battery element, of a wire $g$ formed to surround the periphery thereof, said wire being provided with bent wires $h$ clamped thereto, and projecting on each side of the mat, substantially as described.

7. The combination with battery plate A of the two loops $l$, $m$, one on each face of the plate, and clamped together at top and bottom, substantially as described.

8. In a frame for battery plates, the insulated wire $k$ formed into a spiral of two turns, the ends of the wire forming a coil overlapping and being clamped together and to a part of the wire forming a coil whereby the frame can be slipped on to a battery plate in the manner described.

9. In an electrode for secondary batteries, the combination of two coils $b$ $b$, of insulated wire having their free ends placed together, as described, with the sheet metal clips or clamps securing said free ends together, substantially as described.

10. In a storage battery, the combination with the metallic cell, of several steel or other metal plates clamped together and electrically connected to said cell by a bolt, substantially as described.

11. The herein described process of treating batteries which consists in dipping the battery plates previously coated with paraffine or the like into the electrolyte contained in the cell, and applying heat to the electrolyte to remove the coating from the plates, whereby on cooling of the electrolyte, the said coating will be caused to float on the surface of the electrolyte forming a seal therefor during use of the battery, substantially as described.

WILLIAM A. PHILLIPS.
JUSTUS B. ENTZ.

Witnesses:
JAS. C. SUYDAM,
MAURICE BLOCK.